United States Patent
Balma et al.

[11] Patent Number: 6,157,945
[45] Date of Patent: Dec. 5, 2000

[54] DIGITAL COMMUNICATION DEVICE AND METHOD INCLUDING A ROUTING FUNCTION

[75] Inventors: Phillip J. Balma, Salinas; Alan Robins, Manteca, both of Calif.

[73] Assignees: Ricoh Company, Ltd., Tokyo, Japan; Ricoh Corporation, San Jose, Calif.

[21] Appl. No.: 09/108,116

[22] Filed: Jul. 1, 1998

[51] Int. Cl.[7] .................................................. H04M 11/00
[52] U.S. Cl. .......................................... 709/206; 345/329
[58] Field of Search ............................... 379/201; 706/10; 705/42; 370/408, 428; 709/224, 246, 200, 206, 238; 345/329; 707/10

[56] References Cited

U.S. PATENT DOCUMENTS

| | | |
|---|---|---|
| 4,500,919 | 2/1985 | Schreiber . |
| 5,513,126 | 4/1996 | Harkins et al. . |
| 5,608,874 | 3/1997 | Ogawa et al. ........................ 709/238 |
| 5,648,916 | 7/1997 | Manduley . |
| 5,657,461 | 8/1997 | Harkins et al. . |
| 5,675,733 | 10/1997 | Williams ................................ 709/200 |
| 5,715,397 | 2/1998 | Ogawa et al. ........................ 709/246 |
| 5,724,410 | 3/1998 | Parvulescu et al. . |
| 5,740,231 | 4/1998 | Cohn et al. . |
| 5,796,394 | 8/1998 | Wicks et al. ........................... 345/329 |
| 5,838,685 | 11/1998 | Hochman ............................... 370/428 |
| 5,872,926 | 2/1999 | Levac et al. ........................... 709/206 |
| 5,903,730 | 5/1999 | Asai et al. ............................. 709/224 |
| 5,915,008 | 6/1999 | Dulman ................................. 379/201 |
| 5,920,848 | 7/1999 | Schutzer et al. ....................... 705/42 |
| 5,937,397 | 8/1999 | Callaghan .............................. 706/10 |
| 5,940,396 | 8/1999 | Rochberger ............................ 370/408 |
| 6,023,700 | 2/2000 | Owens et al. .......................... 707/10 |

OTHER PUBLICATIONS

Communications of the ACM, "Collaborative, Programmable Intelligent Agents", Bonnie A. Nardi, James R. Miller, and David J. Wright, Mar. 1998/vol. 41, No. 3, pp. 96–104.

Kearney P. Personal Electronics, Personal Agents, IEEE Apr. 30, 1996.

Fei et al. Intelligent Agents for Network Management. IEEE Apr. 14, 1997.

*Primary Examiner*—Le Hien Luu
*Assistant Examiner*—Thong Vu
*Attorney, Agent, or Firm*—Oblon, Spivak, McClelland, Maier & Neustadt, P.C.

[57] ABSTRACT

A method and system for routing or forwarding communications to an intended recipient. The communications may be from a variety of sources including facsimiles and electronic mail messages. The programming of routing information may be performed manually or may be obtained automatically from other programs which store information regarding the location of a user. For example, a computerized scheduler, calendar, or other type of personal information manager may be read to obtain information about the recipient. The forwarding or routing of communications to the intended recipient may be made based on one or more of the time and date, an indication from the intended recipient that he has arrived at a predefined location or at a new and undefined location, based on an automatically sensed position of the recipient, or based on checking in to a hotel by the intended recipient.

26 Claims, 12 Drawing Sheets

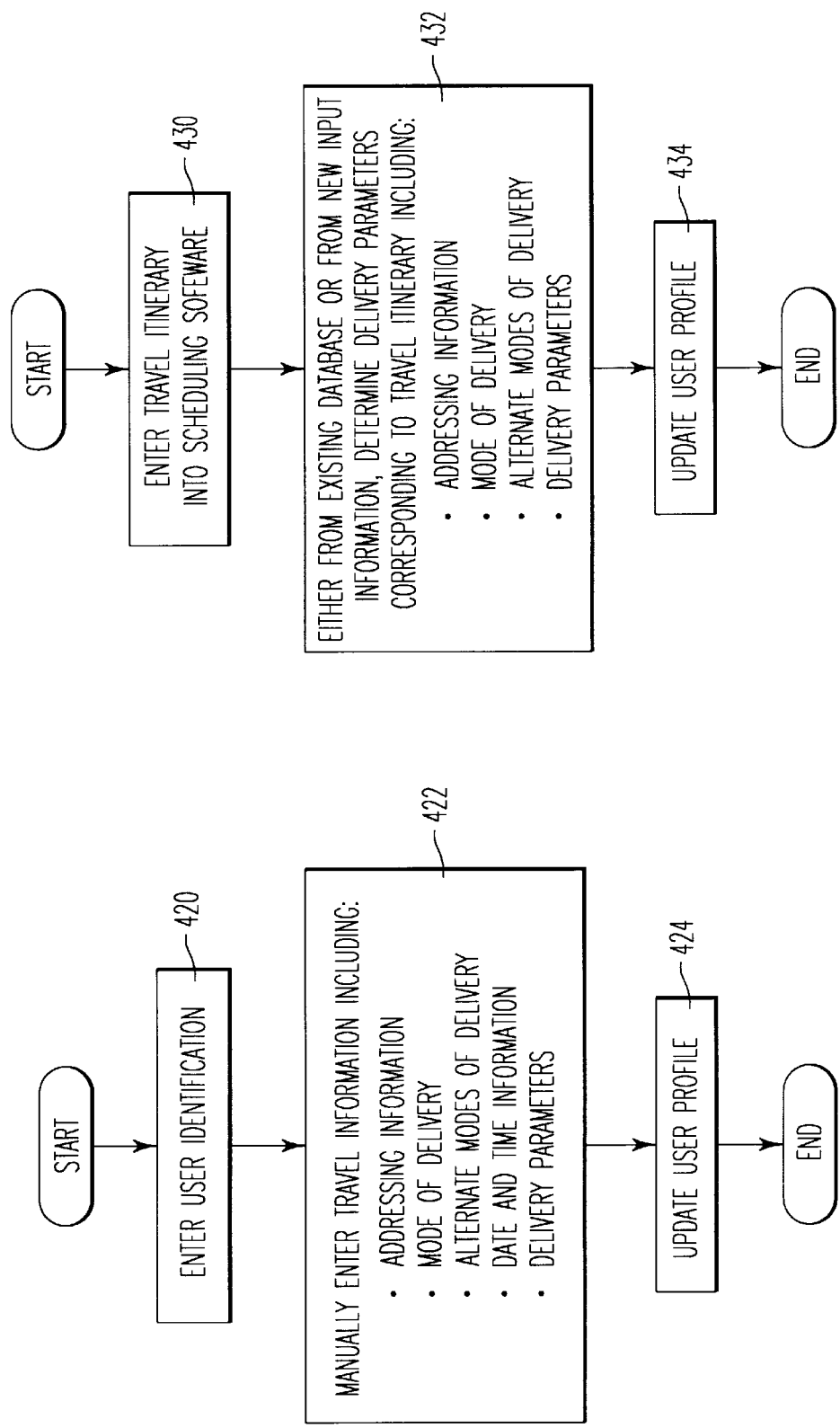

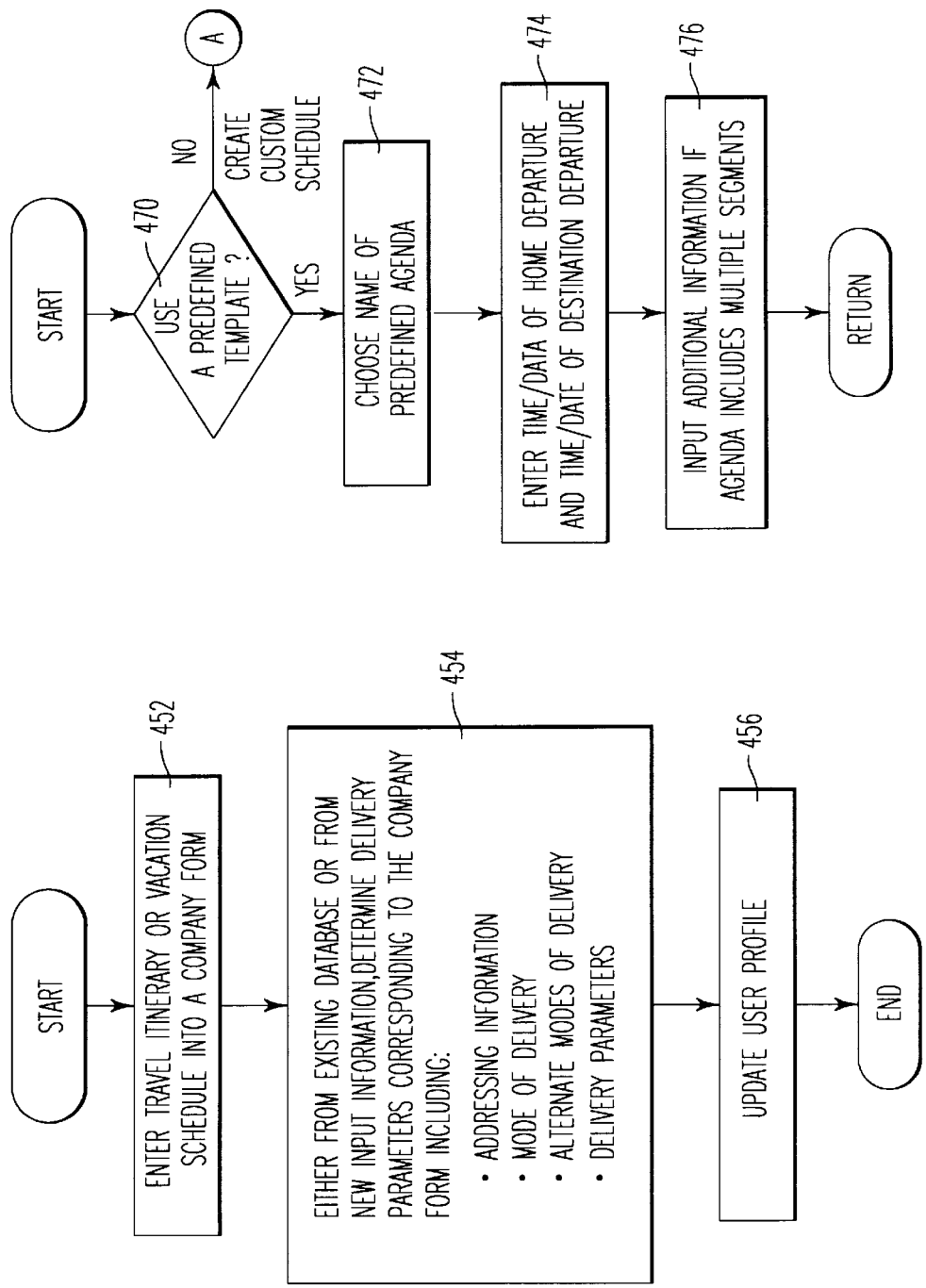

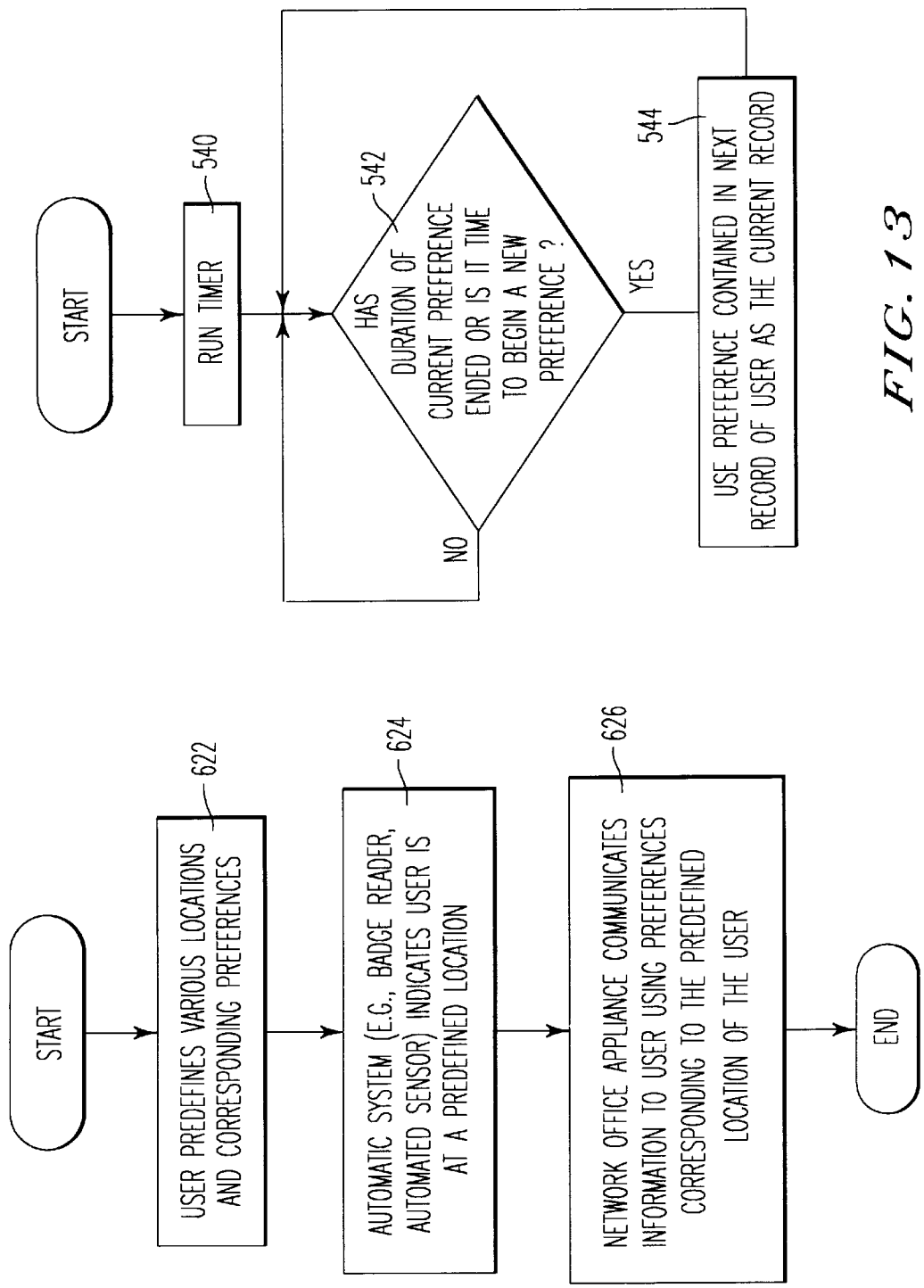

DIGITAL COMMUNICATION DEVICE AND METHOD INCLUDING A ROUTING FUNCTION

BACKGROUND OF THE INVENTION

1. Field of the Invention

This invention is related to a method, system, and article of manufacture including a computer program product for routing communications. The invention is further related to a method and system for routing written and/or typewritten communications to a recipient in a format desired by the recipient and using a communication mode which is the preferred communication mode of the recipient.

2. Discussion of the Background

Devices which electronically route written communications to a recipient are known. For example, U.S. Pat. Nos. 5,513,126 and 5,657,461, both of which constitute part of the present disclosure and are incorporated herein by reference, disclose a system in which a person may define his or her preferred manner of receiving written communications. However, the system disclosed in the above-recited two U.S. patents primarily relies upon a sender determining the preferred mode of communication of the recipient and then manually selecting the mode used to transmit the information. A profile is defined by the recipient, this profile is made available on the network, and the sender can look-up the profile of the recipient and transmit the information to the preferred location of the recipient. However, while such a system was an early attempt to solve the problem of properly routing communications, there are no features of this system which permit a plurality of different locations, addressing information, or modes of communication to be programmed into the system so that an automated selection of one of the communication modes is made in accordance with the recipient's preferences.

SUMMARY OF THE INVENTION

Accordingly, it is an object of the invention to provide a system for routing any communication such as communications in a written and/or audible format to a location where the recipient intends to be using the mode of communication which is preferred by the recipient.

It is another object of the invention to provide a method, system, and computer program product which selects the destination and communication mode utilized to transmit communications to a recipient based on scheduling information.

It is a further object of the invention to provide a novel communication system which overcomes the disadvantages of the prior art systems.

At least one of the above objects is accomplished by the present invention and the above objects are provided in order to assist the reader in understanding the invention but it is not necessary for each and every object to be accomplished by every claim herein. The invention includes a method, system, and computer program product which forward communications from a device such as a network office appliance (e.g., a networked device having communication capabilities, and scanning and/or printing capabilities) to a location of the recipient. A plurality of locations to which communications are to be routed, a communication mode, and addressing information corresponding to each location are stored. The location of the recipient is selected and communications intended for the recipient are forwarded to the selected location using the corresponding communication mode and addressing information.

The selecting of the location and corresponding addressing information and communication mode may be performed temporally, for example using scheduling information in conjunction with time information. When the time program med in the scheduling information is reached, the routing of communications is automatically changed.

In addition to or as an alternative to the location to which communications are being routed being changed based on time, the system may require the recipient to indicate in some manner that he or she has arrived at the scheduled location. Such an indication would prevent communications from being transmitted to a location which the recipient intended to be at but for whatever reason, the recipient never reached.

The selecting of the physical location may be performed in response to the recipient checking-in at a hotel, motel, or other lodging facility. A hotel computer will communicate with the network office appliance to indicate that the recipient has arrived at the hotel and that communications are now to be forwarded to the hotel. Alternatively, the recipient may manually send a message or communication to the network office appliance indicating that he has arrived at the location and therefore, the communications are to be routed to that location.

The inputting of the travel or location information of the recipient may be automated in order to provide added convenience for the recipient. For example, if the recipient works for a corporation or other entity which requires the submission of travel approval or report forms used for example for keeping track of expenses, the information from these forms which has been entered into a computer may be read so that communications are properly delivered.

Alternatively, the location information of the recipient may be obtained from a computer of the travel agent or from a scheduling program of the recipient which is generally used to keep track of appointments and/or the recipient's schedule and therefore, the traveler location information does not have to be input a second time just for the forwarding of communications.

An intelligent program called a software agent may investigate various databases in an automatic fashion in order to determine the recipients intended location. If desired, travel schedules or locations which are utilized or visited by the recipient on more than one occasion may be programmed into the system as a template. Thus, when the recipient takes a trip for which a corresponding template has already been stored, the recipient may simply indicate the dates of the trip which correspond to the location(s) of the trip without entering the communication mode and addressing information each time. Such a template allows a rapid programming of the scheduling information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a flowchart showing how a user manually enters travel and communication delivery information;

FIG. 10 is a flowchart for entering travel information using computerized scheduling software;

FIG. 11 is a flowchart for entering travel information utilizing standard company forms;

FIGS. 12A and 12B are a flowchart which utilizes templates for storing travel agendas of a user which are used on a regular basis;

FIG. 13 is a flowchart illustrating the switching of the routing of communications based on time;

FIG. 17 is a flowchart illustrating the switching of communications based on automated sensing of a location of the recipient.

DESCRIPTION OF THE PREFERRED EMBODIMENTS

Figure 1:
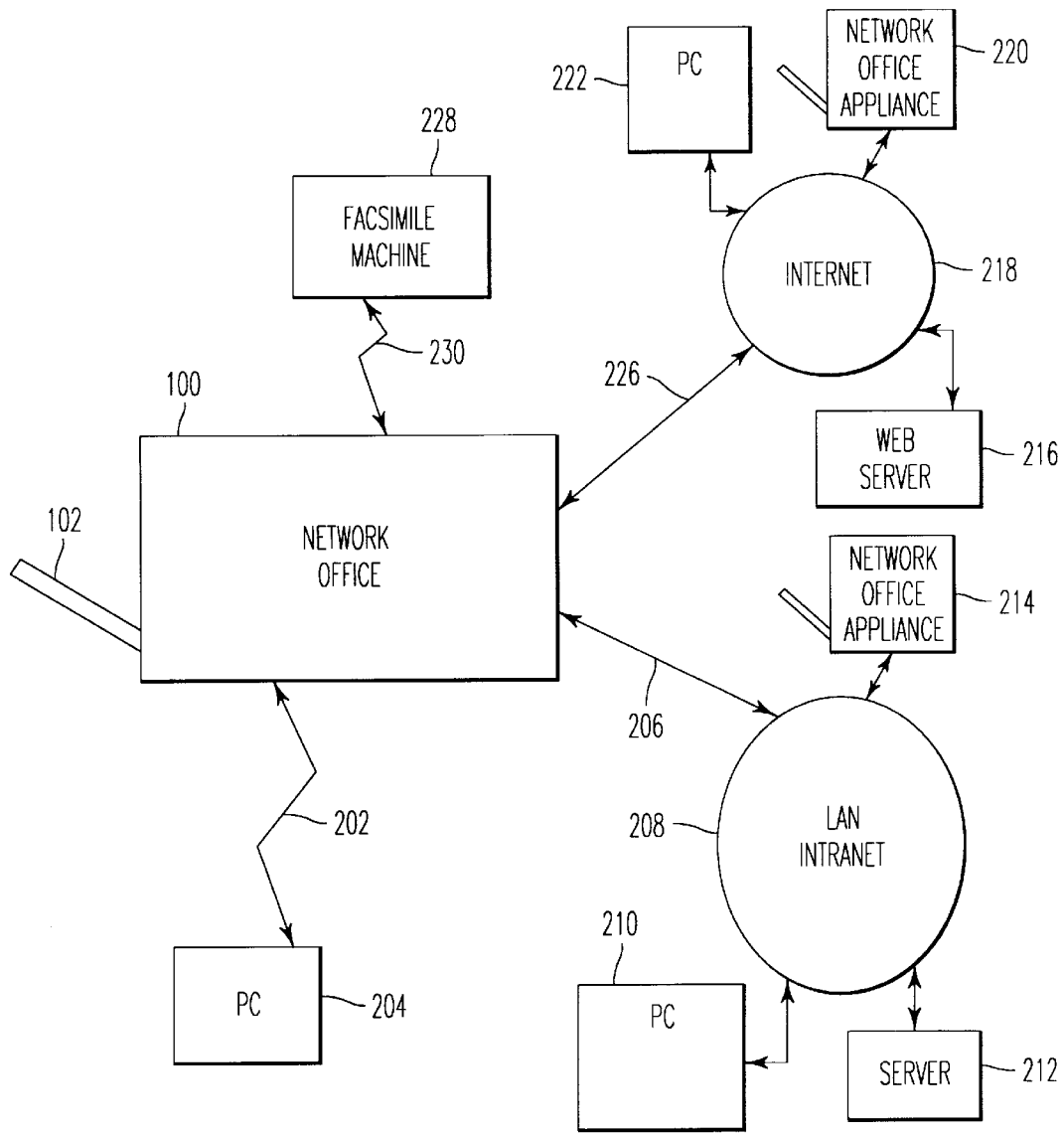
FIG. 1 illustrates a system diagram of the invention including a plurality of network office appliances.

Referring now to the drawings, wherein like reference numerals designate identical or corresponding parts throughout the several views, and more particularly to FIG. 1 thereof, there is illustrated a system diagram of a network which is utilized to route communications. A principle component of the system is a network office appliance 100 which may include various information obtaining, reproducing and communication functions. For example, the network office appliance includes a printing function which outputs printed pages to a paper tray 102. The network office appliance also preferably includes a scanning function. Details of the network office appliance 100 are explained below with respect to FIG. 2.

A personal computer 204 is connected to the network appliance 100 using a telephone line 202, for example. As an alternative, communication between the personal computer 204 and the network office appliance 100 may be through any communication medium including a wireless communication medium such as radio frequency or infrared, or through any type of communication medium including wires, fiber optics, and/or through intermediate computers or routers.

Also connected to the network office appliance 100 is a Local Area Network (LAN) Intranet and the Internet 218 or any type of wide area network (WAN). Connected to the LAN Intranet 208 is a personal computer 210 and a computer server 212. There is also another network office appliance 214 connected to the LAN Intranet 208. A communication channel 206 connects the network office appliance 100 to the LAN Intranet 208.

The Internet 218 has connected thereto a World Wide Web computer server 216, a network office appliance 220, and a personal computer 222. The Internet 218 is linked to the network office appliance 100 through a communication channel 226. Also connected to the network appliance 100 is a facsimile machine 228 through a telephone line 230 or through any other communication medium including a wired communication medium and a wireless communication medium. The wired or wireless communication medium may include the use of the Internet and/or a local area network and if desired, an Intranet.

The system of FIG. 1 is merely an illustrative system and any type of system or network may be utilized with the present invention. The task which is accomplished by the network illustrated in FIG. 1 is the routing or forwarding of communications to a recipient, using the mode of communication preferred by the recipient to a location preferred by the recipient, and if desired, at the time and date preferred by the recipient. The recipients may be from any sender and have any type of mode of communication and communication parameters. Similarly, the communication which is transmitted to the recipient may be any type of communication and use any mode or parameters for the communication. For example, a facsimile may be transmitted from a sender to a computer or the network office appliance 100 and then forwarded as an electronic mail message to the recipient. As another example, an electronic mail message transmitted to the address of the recipient may be received by the network office appliance 100 or other type of computing device, converted to a facsimile format, and transmitted as a facsimile to the recipient.

As explained below, the preferred form of communication, as defined by the recipient, is used to deliver messages. However, if the profile of a user is not complete enough, the present invention allows automatic selection of the mode of communication to be used to deliver a message. For example, if the system was aware that the intended recipient was at a location having a compatible network office appliance used to receive communications, an automatic decision could be made as to what form the communication should take, if the user did not define the desired mode of communication. For example, if the intended recipient was at a location having a compatible network office appliance, the system could automatically and properly forward communications in an appropriate format, even if not entered by the recipient. For example, the system may be programmed, when not changed by a user, to convert from email to facsimile, from facsimile to email, from a PowerPoint file to disk, from a PowerPoint file to a slide. This is in effect a default conversion which may be defined by a system administrator. Additionally, different conversions may be used if the recipient did not have a compatible network office appliance at the receiving end and convert emails to facsimiles, leave facsimiles as facsimiles (e.g., no conversion), convert PowerPoint files to facsimiles, etc.

The network office appliance 100 may serve as a device to generate communications. For example, if the network office appliance 100 includes a scanner, a document or image to be transmitted may be scanned by the scanner and then forwarded using the appropriate communication medium to the recipient. Similarly, if a storage media such as a disk or tape (or the information thereon) is to be forwarded, a storage drive within the network office appliance 100 will read the media and forward the contents of the disk or tape, or individual or selected files thereon, to the recipient, and preferably to a network office appliance which is conveniently located near the recipient. As an alternative to forwarding communications which originate at the network office appliance, the network office appliance may be utilized to route received communications. For example, the facsimile machine 228 may transmit a facsimile to the telephone number of the intended recipient. The network office appliance 100 will be programmed, in certain instances, to know that the intended recipient is out of town and to forward the received facsimile communication to the recipient at the location of the recipient using the preferred communication mode of the recipient. Thus, any type of communication or information either received by the network office appliance 100 or generated at the network office appliance 100 may be forwarded to the location of the recipient in a manner desired by the recipient.

Figure 2:
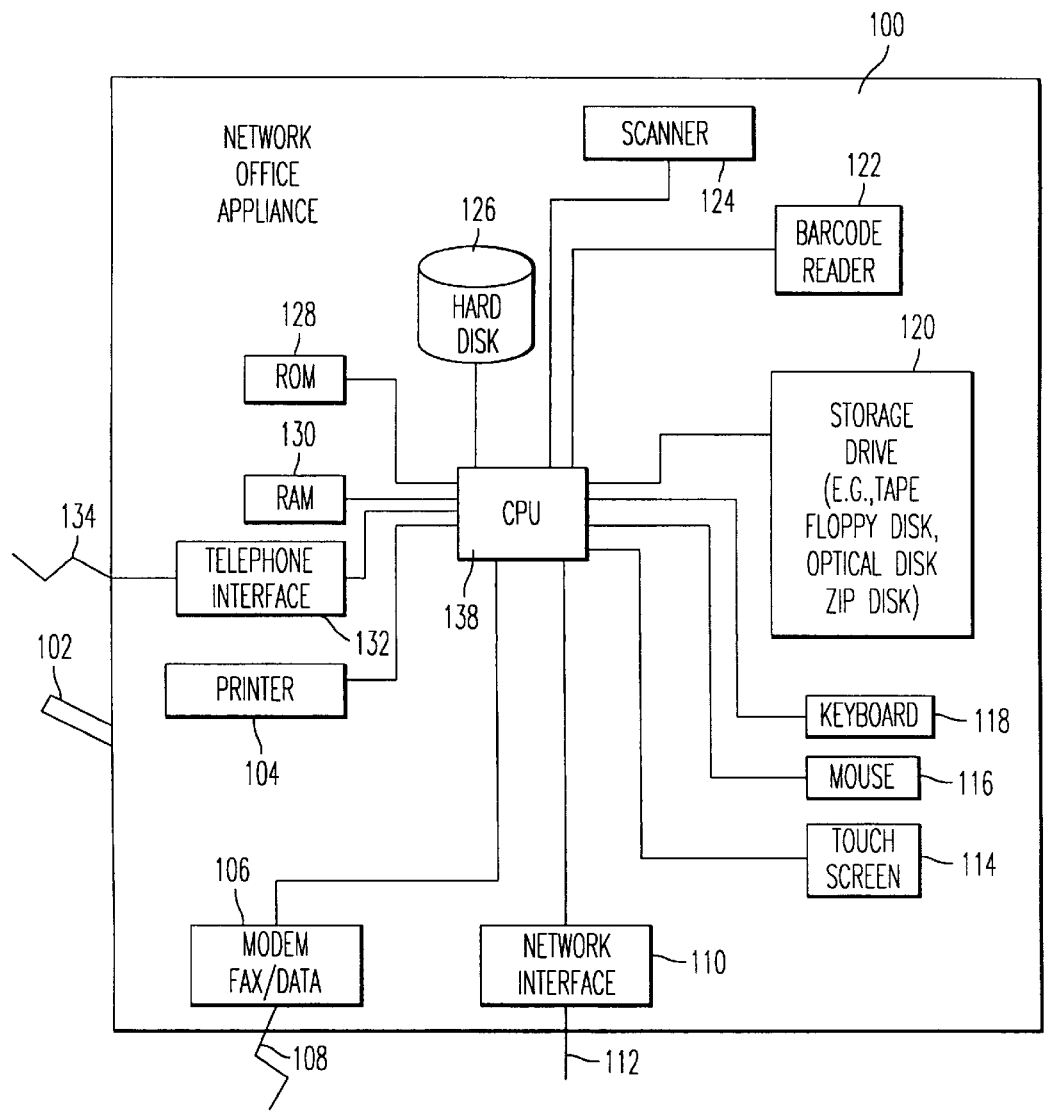
FIG. 2 illustrates the components of a network office appliance.

FIG. 2 illustrates exemplary components of the network office appliance 100. The illustrated components of the network office appliance are preferred or exemplary components set forth in block diagram form. However, each and every component illustrated in FIG. 2 is not required for the invention. Alternatives may be utilized within the network office appliance and/or components illustrated in FIG. 2 eliminated, as desired. In FIG. 2, a printer 104 outputs printed information to the print tray 102. The printer 104 may be implemented in any desired fashion including through the use of a laser printer, an impact printer, an ink jet printer, a thermal printer, or any desired or known printer. A modem 106 is utilized to communicate facsimile information and data between the network office appliance 100 and another device, utilizing a communication line 108. Communication line 108 is preferably a telephone line, although any other communication media including wireless communications may be utilized to transmit and receive information utilizing the modem 106. A network interface 110 is connected to a network 112 which may be any type of network including a local area network, a wide area network, and the Internet.

The network office appliance 100 includes user interface devices including an optional touch screen 114 or an alternative display device. A display of the network office appliance may be implemented using any desired structure including utilizing a liquid crystal display, light emitting diodes, a plasma display, or any suitable display device. The network office appliance 100 further includes input devices such as a mouse 116 and a keyboard or keypad 118.

The network office appliance 100 preferably contains one or more storage drives 120 such as a tape drive, a floppy disk drive, an optical disk drive, a magneto-optical disk drive, a Zip disk drive, or any other suitable storage drive which has a removable media for storing information. Alternative types of storage media which may be used with the storage drive include solid state storage devices such as semiconductor based storage drives or storage drives which do not have any moving parts. Alternatively, any desired storage drive may be utilized in the network office appliance 100. A bar code reader 122 may be utilized to input any desired information and the printer 104 may be utilized to print bar codes. A scanner 124 is utilized by the network office appliance 100 to obtain scanned images of pictorial and/or textual information, or any other information. The scanned images may be forwarded to the intended recipient, for example as a facsimile or attached to an electronic mail message. Alternatively, the scanned information may be subject to an optical character recognition process and transmitted to the recipient as a text message, for example using ASCII text codes or in any desired format including any type of word processing file format.

Further elements of the network office appliance 100 include a hard disk drive 126, a read only memory 128 and a random access memory 130. These components may be utilized to store programs and/or data, as desired. Further, any other storage devices may be utilized by the network office appliance, as desired, so that the desired functions are performed. For example, the system may use a different type of non-volatile memory such as a flash memory or electronically erasable programmable read only memory to store desired information. The network office appliance 100 further includes, if desired, a telephone interface 132 which connects to a telephone line 134. This device may be used to receive telephone calls and/or voice mail messages for processing and forwarding to the intended recipient. A CPU 138 controls the general operation of the network office appliance and is accessible by the various component of the network office appliance. The telephone interface 132 may further be utilized to communicate with a transmitting device pages in order to page a recipient. The page may be used to communicate any type of information including audio image, and textual information, as desired.

Figure 3:
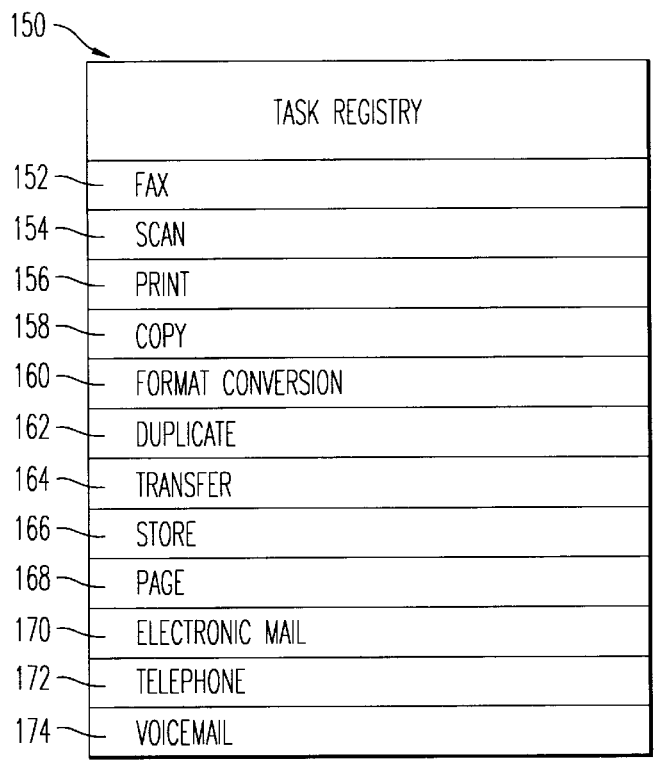
FIG. 3 illustrates a task registry indicating the available functions which may be performed by the network office appliance.
Figure 4:
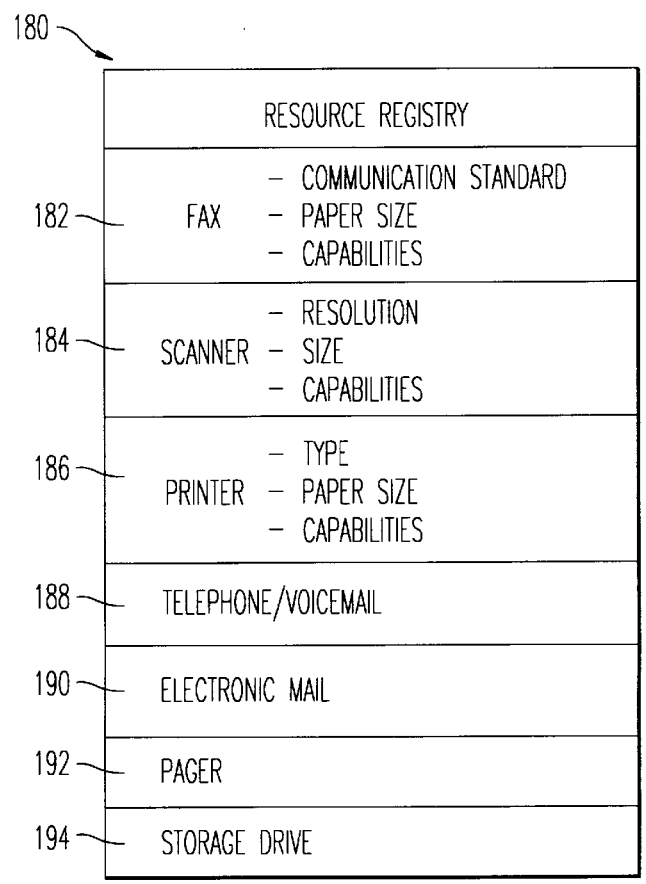
FIG. 4 illustrates a resource registry which defines the physical capabilities and resources of or available to the network office appliance.
Figure 5:
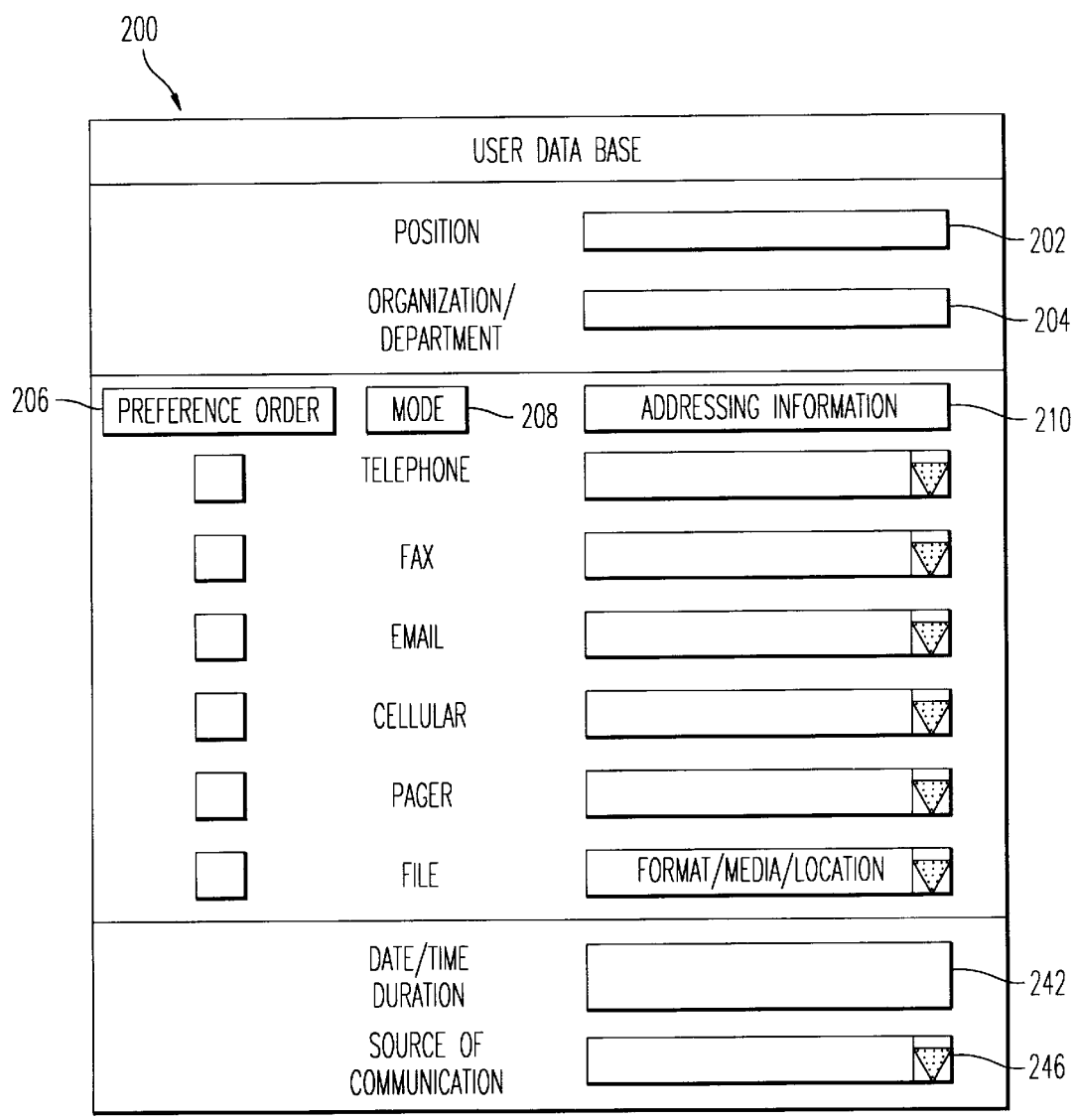
FIG. 5 illustrates a user database which defines information of the user or recipient and the preferences of received communications.

The hardware illustrated in FIGS. 1 and 2 may be controlled by software in any desired manner. One manner of allowing control of the hardware is through use of a task registry illustrated in FIG. 3 which lists the tasks or functions which may be performed by the network office appliance 100, a resource registry illustrated in FIG. 4 which lists and describes, if desired, the physical capabilities of the network office appliance 100, and a user database illustrated in FIG. 5 which is utilized to store the preferences of receipt of communication for each recipient. It is to be noted that the software structure as illustrated in FIGS. 3–5 are merely exemplary and are not a strict requirement of the invention. Thus, the software structure as illustrated in FIGS. 3–5 may be eliminated, if desired, or created in a different manner or to have their functions performed in a different manner.

FIG. 3 illustrates the task registry 150 which defines the various tasks or functions which may be performed by a network office appliance. This task registry is stored in any memory of the network office appliance or alternatively, in a memory of any other computerized device. The task registry 150 includes exemplary fields 152–174 which are utilized to define the various functions which the network office appliance is capable of performing. For example, field 152 indicates that the network appliance is capable of transmitting and receiving facsimiles, field 154 indicates that the network office appliance can scan, 156 indicates a printing capability, 158 indicates a copying capability. Digital files may be operated on by the network office appliance and it may be possible to convert the format of a file, as indicated by field 160. For example, format conversion may be utilized to transfer a word processing file from a WordPerfect format to a Word format. Alternatively, the format conversion may convert between a different file type of an image file, such as between a JPEG format, and a bit mapped format. Field 162 may be used to indicate that files may be duplicated at the network office appliance, and 164 may be utilized to transfer files. Field 166 indicates that the network office appliance has the capability of storing files which are received.

Other fields in the task registry 150 include field 170 which indicates that the network office appliance is capable of processing and forwarding electronic mail messages, field 172 indicates that the task registry 150 is capable of processing and forwarding telephone calls, and field 174 indicates that the network office appliance is capable of processing and forwarding voice mail messages. Any of the fields of the task registry 150 may include further details, if desired, of the various tasks which can be performed by the network office appliance.

A resource registry 180 which is illustrated in FIG. 4 is utilized to store the physical capabilities of the network office appliance, and if desired, parameters and capabilities thereof. For example, a field 182 indicates that the network office appliance is capable of communicating using a facsimile device and stores details such as the communication standard used by the facsimile device, the various paper sizes which can be handled by the facsimile machine, and other capabilities of the facsimile machine. A field 184 indicates that the network office appliance includes a scanner, and parameters of the scanner may be defined including the resolution of the scanner, the size of the scanner, and other capabilities of the scanner. A field 186 indicates that the network office appliance contains a printer including the type of printer, the paper sizes which can be handled by the printer, and other capabilities of the printer. Field 188 indicates whether the network office appliance has telephone and/or voice mail capabilities, field 190 indicates electronic mail capabilities, 192 indicates the capability of performing or causing to perform pager tasks, and field 194 indicates the storage drives of the network office appliance. The storage drives may be used to indicate that the network office appliance includes a tape drive and the format of the tape drive, or a disk drive and the format and capabilities of the disk drive or any other information of any type of storage drive or device.

The structure and content of the registries in FIGS. 3 and 4 are dynamic and may be altered in any desired manner. The number of fields may be increased or decreased depending on the actual capabilities of the described network object or network office appliance. Thus, if the network office appliance supports facsimile communications, then a facsimile entry will appear in the registry. This flexibility allows for additional or different devices, for example which are unforeseen or unknown at the time of this writing or simply not desired, to be utilized with the system.

If desired, the present invention may perform a query to determine the various capabilities of a device, etc., which are used in the registries of FIGS. 3 and 4. For example, in the Simple Network Management Protocol (SNMP), agents or devices monitor the activity in and/or capabilities of various devices on a network, and may be utilized by the invention to determine device capabilities. Alternatively, any other manner including using known techniques of determining device or system capabilities may be used.

In order to transmit or forward communications to the recipient, it is necessary to know the preferences or profile of the recipient. FIG. 5 illustrates a record or fields of a record of a user database for storing the communication preferences of the recipient. The user database 200 includes a position 202 of the recipient such as his or her title such as vicepresident, manager, etc. The position 202 may be used to filter incoming communications. For example, only people who have direct (or relatively close) reporting relationships with a person may be able to send mail to that person. In addition to or as an alternative to this concept, the position 202 which may be considered a ranking may dictate that only communications from people of a certain position level or ranking are forwarded, such as when the intended recipient is on the road. Such a concept functions like corporate spasm filtering. An advantage of this concept is that higher ranking people within a corporation or organization will not be overwhelmed with communications. When the higher ranking person is on the road or away from his/her normal location, this could be a significant problem. An organization/department field 204 is utilized to store other information of the recipient such as the company and department of the company in which the recipient works.

The next section of the user database 200 defines the communication preferences of the user, and the first column 206 defines the preference order in which the various modes of communication are to be used, the second column 208 a mode of communication associated with the preference, and addressing information 210 for each mode of communication in the third column. For example, if the recipient desires to receive communications by electronic mail, the box for the preference order of the email mode entry would have the number 1 therein and the corresponding addressing information box would have selected the preferred electronic mail address of the recipient. The arrow in the right column corresponding to the addressing information may be selected graphically in order to reveal a list or a plurality of addressing information corresponding to each mode of communication. The modes illustrated in the second column 208 are merely exemplary and include a telephone mode, a facsimile mode, an electronic mail message mode, a cellular telephone mode, a pager mode, and a file transfer or processing mode. The file mode has specified for the format of the storage media, the type of media, and the location of the storage drive. The preference order 206 in the user database 200 can be used to specify alternative modes of communication when the primary mode of communication fails. For example, if the first preference of a user is facsimile, and the network office appliance 100 attempts to transmit a facsimile to the recipient but the facsimile cannot be successfully transmitted, the second preference may be used such as electronic mail. If the second choice cannot successfully deliver the communication, the third choice in the preference order may be attempted, and so on.

The bottom portion of FIG. 5 contains a date/time duration field 242. The field 242 may be utilized to indicate that this particular record specifying the communication preference is only valid for a certain or predetermined time period or duration. For example, field 242 may be utilized to indicate that the particular preference is valid on weekends, on Fridays, on the recipient's birthday, on a specific date while the recipient plans to be traveling, or at any other date/time duration.

Further, the user database 200 contains a field 246 indicating the source of communication for which this record will be used. For example, if a facsimile is transmitted to the network office appliance for ultimate distribution to the recipient, the user could indicate in field 246 that when the source of communication is a facsimile, the preferred mode of receipt is facsimile. Alternatively, a different record may be created for other communications such as electronic mail which indicates that electronic mail messages, when received, are forwarded in an electronic mail message format.

The present invention is not limited to the modes illustrated in FIG. 5 but any type of mode may be utilized. For example, there may be an image receipt mode which is utilized to transmit images scanned at a scanner connected to the network office appliance 100. Further, the modes may have specific parameters defined therefor. For example, there may be defined that incoming facsimiles may be subject to an optical character recognition process and forwarded as a specific type of word processing file such as a Microsoft Word or WordPerfect file which are attached to an Email. Other fields which may be included in the record include further transmission parameters such as the message can be forwarded to the recipient at any time, the message can be forwarded to the recipient only at scheduled times, the message can be forwarded to the recipient upon the recipient transmitting a communication indicating that it is acceptable to transmit the communication intended for the recipient.

The hardware illustrated in FIGS. 1 and 2 and the database information of FIGS. 3–5 are merely exemplary and alternative manners of implementing this invention in software and in hardware are contemplated by this invention. For example, the hardware and software disclosed and utilized by U.S. Pat. Nos. 5,513,126 and 5,657,461, which are both incorporated herein by reference, can be operated in accordance with the teachings herein. Thus, any hardware or software disclosed in these patents are part of the present disclosure.

Additionally, the present invention may be applied to other types of communication and conversion. For example, it is possible to convert textual information to audio information, and audio information to text information, using conventional and known techniques such as those set forth in U.S. Pat. No. 5,724,410 to Parvulescu et al., which is incorporated herein by reference.

Figure 6:
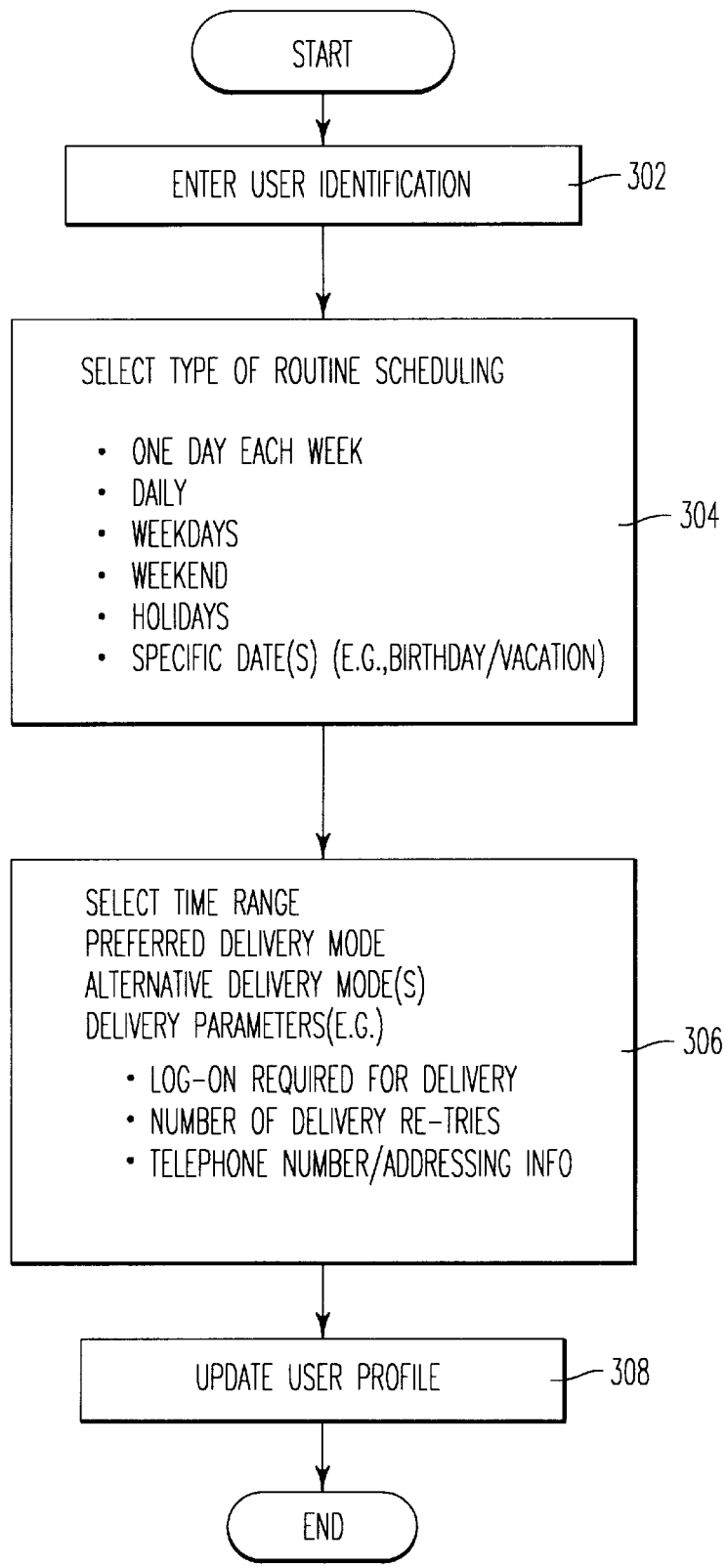
FIG. 6 is a flowchart utilized for entering routine scheduling of the recipient including daily and weekend scheduling.

FIG. 6 is a flowchart for entering routine scheduling information which is utilized to control the forwarding of communications to the recipient. After starting, in step 302 the identification of the user for whom communications are to be routed or forwarded is entered. As this system can preferably route communications for a plurality of users, step 302 is performed in order to identify the particular recipient corresponding to the information which will be entered. In step 304, the type of scheduling which is to be programmed is entered. The scheduling which may be selected includes, for example, scheduling for one day each week (e.g., every Wednesday), scheduling communication forwarding which is to occur on a daily basis (unless overridden by a different schedule which has been entered), scheduling which is for forwarding of communications each weekday, scheduling for holidays, and scheduling for a specific day such as a birthday, vacation, a date during which the person is at a conference, or for any other specific event.

In step 306 the various parameters of the communication forwarding are entered including the time range for forwarding the communication, the preferred delivery mode (e.g., facsimile), the alternative delivery mode(s) (e.g., use electronic mail if a facsimile delivery is not successful), and any other delivery parameters including whether a log on or other check in is required in order to instigate delivery of a communication, the number of times a communication is to be retried before using an alternative mode of communication, addressing information such as a telephone number, or any other parameters used to schedule or route or control the routing or forwarding of the communication. For example, the source of communication which causes a particular type of delivery to occur may be entered, utilizing a field such as the field 246 in FIG. 5. After all information is entered, the user profile is updated in step 308, such as by storing information in a record of the user database, as illustrated in FIG. 5. Alternatively, any manner of storing and updating a profile of the user based on information which has been entered may be utilized. The manner of inputting or entering the information described in FIG. 6 may be through a graphical user interface, through an automatic reading of information created by a different program such as a travel program or a travel agent computer, or in any desired manner including the use of manual inputting of information, for example, using a graphical user interface, using a text interface, or by reading information entered using a different program. The process of FIG. 6 then ends.

Figure 7:
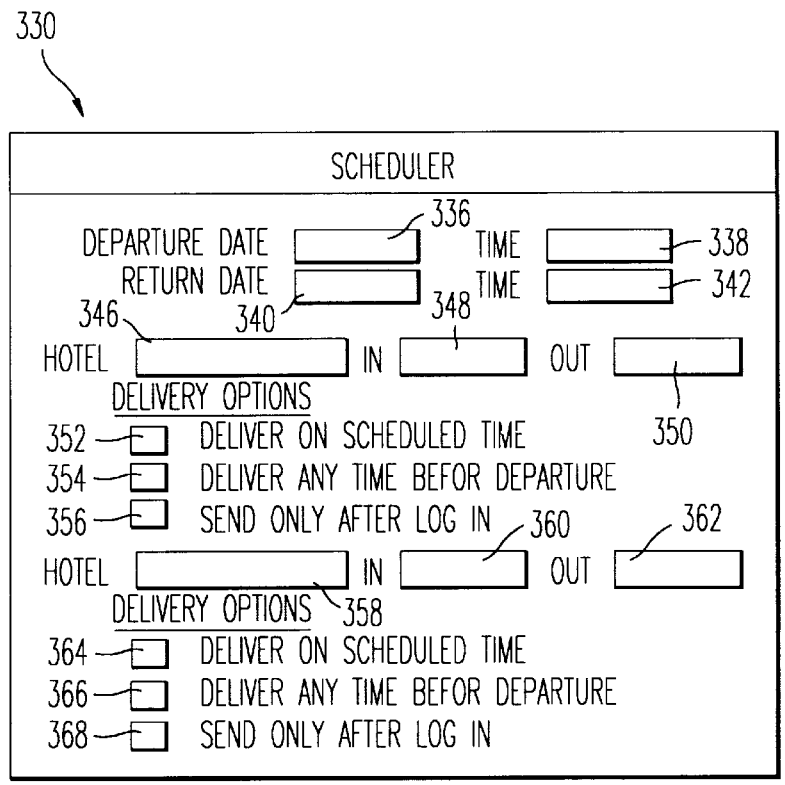
FIG. 7 illustrates a graphical user interface form for entering travel information.
Figure 8:
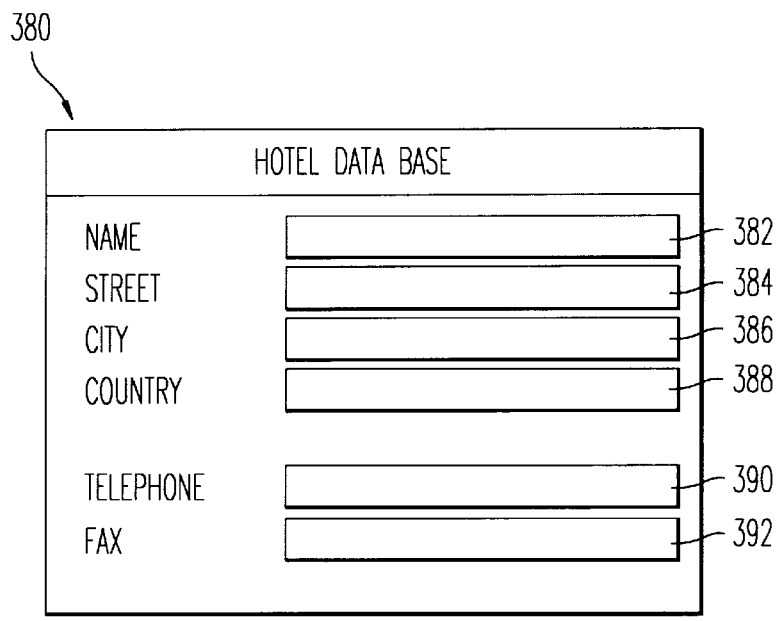
FIG. 8 illustrates a graphical user interface used to obtain information of a hotel at which the recipient intends to stay.

For travel or other times for which delivery must be changed, the forms illustrated in FIG. 7 and 8 may be used to input schedule or delivery information. The scheduler form 330 includes fields to input a departure date 336 and time 338 and a return date 340 and time 342. The hotel (or any other location including any type of temporary work location) is entered in step 346. If this hotel has been previously entered into a database using a record such as that illustrated in FIG. 8, the user is asked for information such as the time checking into the hotel and the time checking out of the hotel. There are various delivery options including an option which allows delivery only at a scheduled time 352, a section used to indicate that delivery can be at any time before departure utilizing field 346, and a field 356 which is utilized to send or forward the message only after the user logs in, in any manner. The hotel database 380 illustrated in FIG. 8 contains various information utilized to route communications to the hotel including a name field 382, a street field 384, a city field 386, a country field 388, a telephone number field 390, and a facsimile number field 392. Alternatively, any other information may be entered including information such as illustrated in FIG. 5. If the hotel out date is earlier than the return date, then a scheduler determines that there are multiple destinations (or hotels or other locations) for this trip and further hotel information is prompted using fields such as 358–368 for further hotel information until the hotel out date matches the return date or when the user stops the entry of information.

FIG. 9 is a flowchart illustrating a process for manually entering travel information. After starting, an identification of the user is entered in step 420. Next, travel information is manually entered in step 422. The information which is entered may be entered utilizing the forms illustrates in FIG. 7 and 8 and/or may include the information illustrated in FIG. 5, if desired. Travel information which may be entered includes addressing information, the preferred mode of delivery, alternative modes of delivery, date and time information such as departure and return dates, any other type of date and time information which is desired, and delivery parameters. It is to be noted that the present invention also includes the entering of departure information and arrival information. For example, for trips during which the intended recipient is unavailable (e.g., the recipient is on an airplane and cannot be reached), the information is not delivered anywhere but stored in a memory of the network office appliance. Upon reaching the destination such as at a specific time and date (or alternatively upon checking in by the user), delivery may be instigated. In step 424, the information which has been entered is stored so that the profile of the user is updated and the process of FIG. 9 ends.

The manual entry of information, implemented for example using the flowchart of FIG. 9 and the forms of FIG. 7 and 8, may alternatively be performed in an automated style using other software applications such as software schedulers, calendars, travel services, other forms, and the like including through the use of groupware. Groupware is software which allows users to conveniently share information such as scheduling, calendar information, or other information over a network. Typical groupware programs include Novell's GroupWise, Lotus' Domino, and Microsoft Exchange. Alternatively, groupware is any technology that facilitates meeting and communication between two or more individuals. If the necessary information regarding a schedule or travel, for example, is input and/or utilized by a different program such as a groupware program or any other program, the redundancy in data entry may be eliminated by sharing or retrieving information from the other program regarding the travel schedule of an intended recipient. FIG. 10 is a flowchart showing the use of software such as groupware to obtain a user's travel information. In FIG. 10, after starting the recipient's travel itinerary is entered into some other software such as scheduling software or groupware, etc. Alternatively, a different type of software such as a calender, planner, or travel planning software may be utilized. Next, in step 432, it is necessary to determine the delivery parameters including addressing information, the mode of delivery, alternative modes of delivery, or any other delivery parameters. This information may be determined from an existing database or from newly input information. If an existing database is used, information regarding previous selections and requested forwarding or routing of communications can simply be read and selected from stored information, for example utilizing a template of information for a particular type of trip, as described below with respect to FIGS. 12A and 12B. The information which is entered is used to update the profile or information of the user in step 434 and the process of FIG. 10 ends.

In FIG. 10, the information regarding the travel schedule of the recipient is obtained from an existing database or storage area. Such a gathering of information from one or more existing databases may be accomplished utilizing a software agent. A software agent is a program that performs a background task for a user and generates a report of what was accomplished. In this case, the agent may be utilized to search through the repositories of information which are pertinent to the travel of the intended recipient. Additional information on software agents which may be utilized by this invention is set forth in the article "Collaborative, Programmable Intelligent Agents," Communications of the ACM, Vol. 41, No. 3, pp. 96–104, which along with all documents cited therein is incorporated herein by reference. As an alternative to utilizing the agent implementation of the invention, a clientserver implementation or any other desired information may be utilized.

Another manner of obtaining information regarding the travel schedule of the intended recipient is to pull information from existing databases, for example such as from a form which is utilized by a company to monitor an employee's travel schedule or expenses. As these forms contain information which is already input into a computer, there is no redundancy required and the user does not have to enter the information again. In FIG. 11, after starting the user or another person enters travel itinerary or a vacation schedule into a company form in step 452. Alternatively, any other type of form may be utilized in this embodiment which is preferably used by a different program, in addition to the program for controlling the routing of communications. In step 454, delivery parameters are entered including addressing information, the preferred mode of delivery, alternative modes of delivery, and delivery parameters in a similar manner as is performed in step 432 of FIG. 10. The user profile is updated in step 456 and the process of FIG. 11 ends. In FIG. 11, if desired, a software agent may be utilized to obtain the information which was entered with respect to the forms or the information may be obtained in any other desired manner.

Figure 12B:
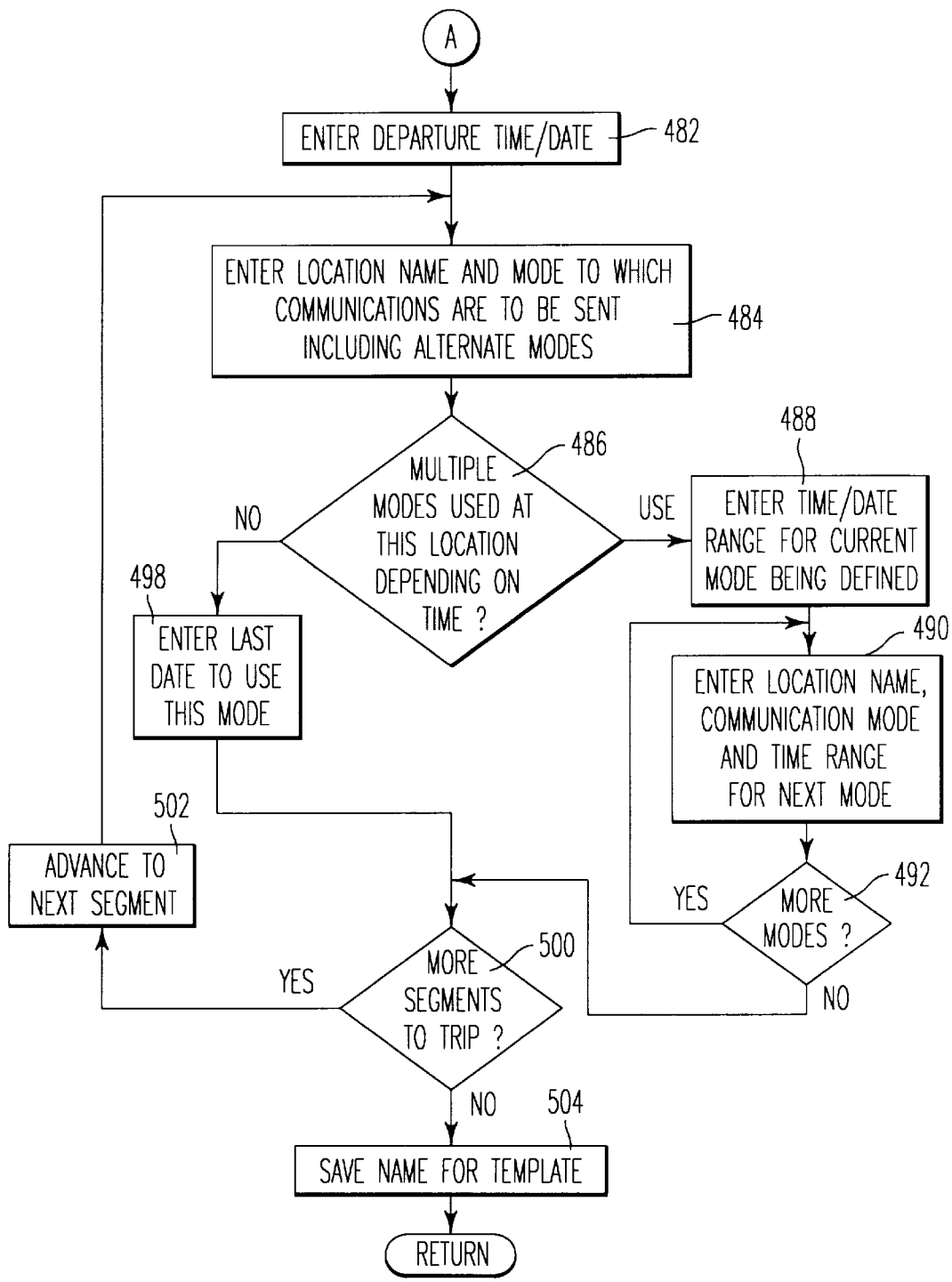

FIGS. 12A and 12B illustrate a flowchart for the use of templates when setting the routing or forwarding information. It is common for people to take similar business trips on a regular basis and instead of entering specific hotel information and/or telephone numbers or other trip information each time the trip is taken, a template or itinerary may be entered or programmed for the user. Thus, each time a similar trip is taken, the information is already stored and does not have to be re-entered but a predefined form can simply be recalled.

In FIG. 12A, after starting, it is determined whether there is a desire to use a predefined template in step 470. If an affirmative response is provided, the name of the predefined agenda or template is chosen or selected in step 472. For this predefined template or agenda, the time and date of home departure and time and date of the destination departure or the return information is entered in step 474. Any other information may be entered including information for additional segments of a trip. Further, travel information of the trip may be modified, as desired, in order to assure that all parameters related to the trip are entered. After step 476, the process ends and control returns to the routine which called the software routine indicating a request to use a predefined template.

If step 470 determines that the user does not want to use a predefined template, control proceeds to process A illustrated in FIG. 12B so that a custom schedule or template may be created. In FIG. 12B, the time of departing the home location of the recipient and date is entered in step 482. In step 484, communication parameters are entered including the name of the location (e.g., a specific hotel in a specific city) where communications are to be forwarded and a mode (e.g., facsimile) which is to be used by communications transmitted to the recipient. Further, any other desired information regarding the transmissions of communications is entered in step 484. If different modes of communication are entered depending upon time, control proceeds from step 486 to 488 where the time and date range for the current mode which is being defined is input. In step 490, the location name, communication mode, and the time range for the next mode is entered. If additional modes are to be utilized at this location, control proceeds back to step 490 where additional information is entered. If there are no more modes, control proceeds from step 492 to step 500.

If step 486 determines that multiple modes of communication are not to be used at this location, control proceeds to step 498 at which the last date and time for which this particular mode is to be utilized is entered. From steps 498 and 492, control proceeds to step 500 which determines if there are more segments to the trip. If there more segments, control proceeds to step 502 which advances to the next segment of the trip, for example to a different city or a different location within the city. From step 502, flow returns back to step 484. If step 500 determines there are no more trip segments, step 504 saves the name for the template corresponding to this trip. Subsequent trips which use similar travel information including hotels and city information may utilize this template which has been generated and stored.

Much of the previously described information pertains to inputting forwarding or scheduling information. The discussion which follows largely pertains to how the information which has been previously entered is utilized and how the forwarding of communications is implemented.

FIG. 13 is a flowchart illustrating the changing of the routing of communication based on temporal information such as the time and date. After starting in FIG. 13, a timer is run in step 540. This timer may be the system clock of a computer which is usually constantly running. Step 542 determines if the duration of the current preference has ended or whether it is time to begin a new preference. If the current time matches the time (or is after a time) at which communications are to be forwarded to a new location, control proceeds to step 544 which indicates that the preference contained in the next record of the user is to be used as the current record for the routing of communications. Alternatively, the record which corresponds to the current time may be utilized as the information which controls the routing of communications. From a negative response in step 542 or after step 544 is completed, control proceeds back to step 542.

Figure 14:
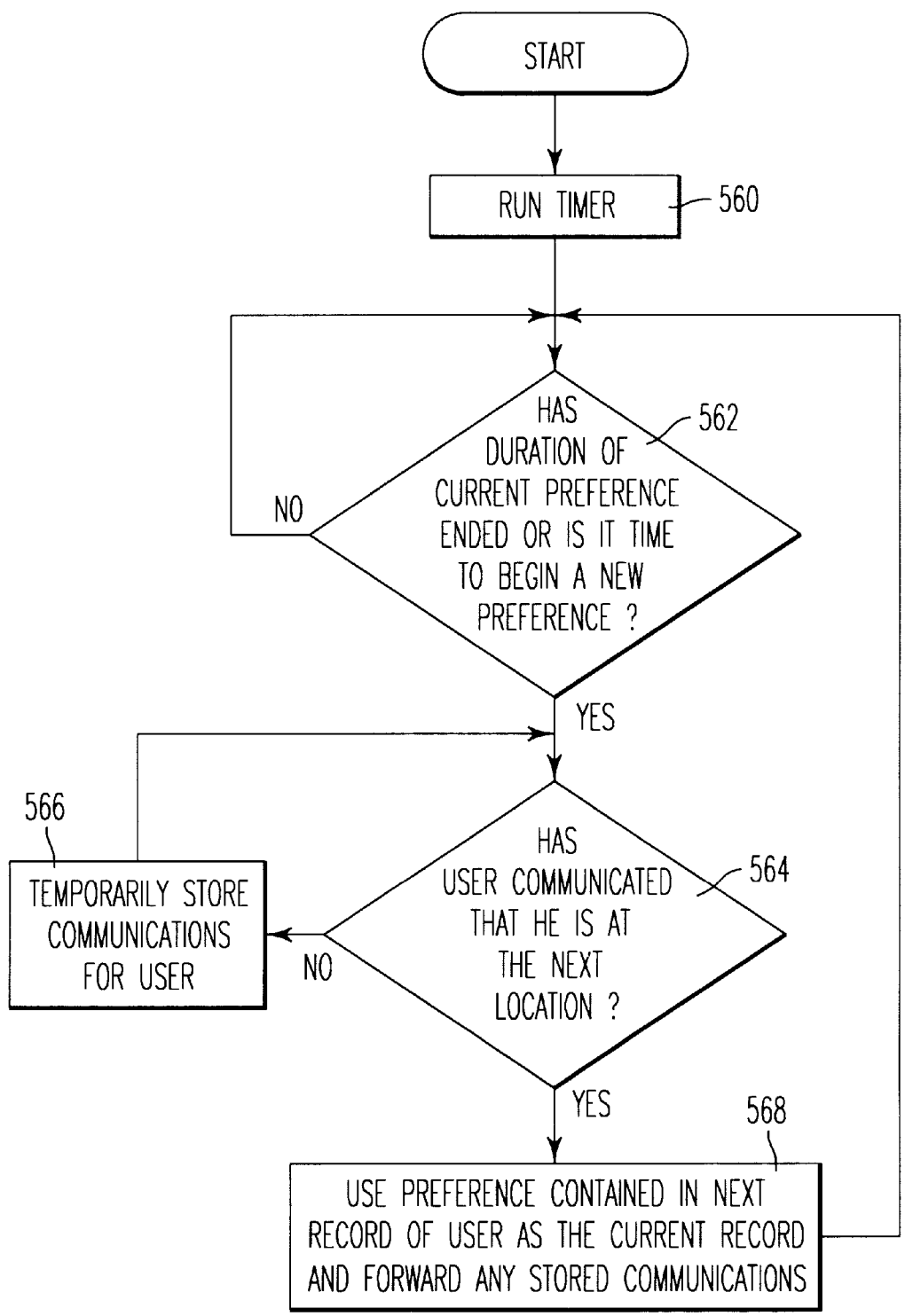
FIG. 14 is a flowchart illustrating the switching of the routing of communications based on time and a user communication indicating that he or she has reached a programmed location.

The flowchart of FIG. 14 is utilized to control the routing of communications based both on time and a confirmation from the user that he or she has arrived at the next programmed location. After starting, a clock or timer is run in step 560. Step 562 then determines if the duration of the current preference has ended or whether it is time to begin a new preference. A negative response to the query of step 562 returns control back to step 562 which continues to be executed until it is time to change the forwarding of communications. When there is an affirmative response to step 562, control proceeds to step 564 which determines if the user has communicated that he is at the next location. In this embodiment, instead of forwarding communications to a user based solely on time, there is a requirement that the user communicate that he is at the next location which prevents the forwarding of communications to a location which the user will not visit because of a change in plans or when the user is delayed. If the user has not communicated that he is at the next location in step 564, control proceeds to step 566 which will temporarily store the communications for the user. From step 566, flow loops back to step 564 which waits for the user to indicate that he is at the next location. Such a checking-in procedure or communication from the user may be achieved using a World Wide Web communication, an electronic mail communication, a telephone call, a telephone call in conjunction with caller ID, or in any desired manner. The telephone call may, in one embodiment, utilize a conventional pay phone or a phone located in a hotel room, etc, which can generate dual-tone multi-frequency (DTMF) sounds and with which a user ordinarily can talk and hear sounds. With the implementation of caller ID, the user merely needs to telephone from the location which the user has reached to a specific telephone number. The sensing of a call from a particular phone number (or even a particular city or area code) may be utilized to trigger the forwarding or routing of communications. When step 564 determines that the user is at the next location, the preference contained within the next record of the user is utilized as the current record and any communications which have been temporarily stored for the user are then forwarded to the new routing information for receipt by the recipient. From step 568, control proceeds back to step 562 to determine if the current preference has ended or if it is time to begin a new preference.

As an alternative or in addition to using a timer to change the routing of communications, a link may be established between a computer controlled by the hotel which upon the intended recipient checking in, forwards a communication to the network office appliance automatically indicating that the recipient has arrived at his or her intended destination and therefore, communications are to be routed to this new location of the recipient. For purposes of this aspect of the invention, the hotel can be any establishment where the intended recipient lodges, including a motel, a company dormitory, company provided housing, a cruise ship, or any similar or other location. For this embodiment, the computer is one which is controlled by the hotel and in the possession of the hotel, and which is utilized to trigger a signal to a network office appliance indicating that the user has arrived at such establishment.

Figures 15, 16:
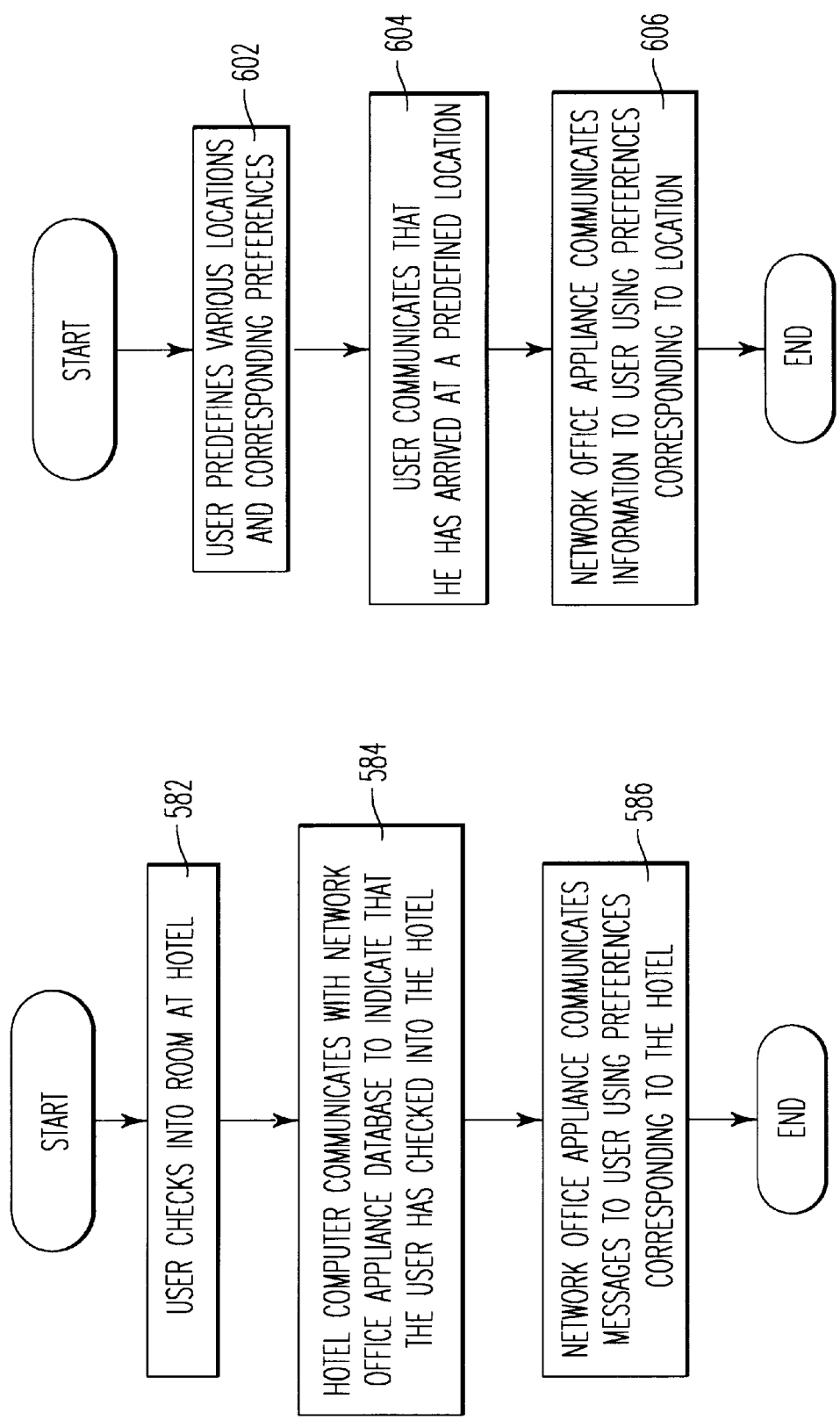
FIG. 15 illustrates the switching of the delivery information based on check-in at a hotel.
FIG. 16 is a flowchart of the switching of the routing of communications based on a communication from a recipient that he or she has reached a predetermined location.

In the flowchart of FIG. 15, the user checks in to the hotel and is assigned or given a room in step 582. In step 584, a hotel computer communicates with the network office appliance or the database thereof to indicate that the user has checked into the hotel and therefore, communications intended for the recipient should now be transmitted to the hotel. In step 586, the network office appliance communicates messages to the user using the pre-programmed or entered preferences corresponding to the particular hotel to which the user has checked in.

In the embodiment of FIG. 16, basing the routing decision on temporal information is not necessary. For example, the user may pre-program his or her itinerary and instead of switching the routing of communications to the user based on time, the routing may be based without consideration of time. In this case, the user simply provides a communication indicating that he has arrived at a predefined location. Such an indication causes the routing of communications for this recipient to the new location.

In FIG. 16, after starting, the user predefines various locations and corresponding communication preferences in step 602. Once the user has arrived at a pre-programmed destination, the user communicates that he has arrived at this predefined or pre-programmed location in 604. Such a communication of arrival may be possible using a telephone with the option of a caller ID signaling, using the World Wide Web, or using Internet electronic mail, for example. Alternatively, any desired form of communication may be utilized to indicate that the user has reached his or her desired destination. Subsequently in step 606, the network office appliance communicates information to the user using the preferences corresponding to the location of the intended recipient.

The user may communicate that he has arrived at a predefined location in any desired manner. For example, the user may simply go to a network office appliance at his or her new location and enter information which indicates that the recipient is at this new location corresponding to the local network office appliance. Alternatively, it is possible for the intended recipient to communicate from the road a change in schedule and indicate that communications are to be routed to a new location without the need to have pre-programmed any information about the new location. Even if the intended recipient makes a drastic change to his/her itinerary, for example by canceling a segment of a trip, but the communication has been forwarded (and stored) at the intended destination where the intended recipient will not visit (or has already left), the system of the present invention includes the capability of automatically forwarding the communication to the new location of the intended recipient to the actual location of the intended recipient, as soon as the location is known (and entered into the system). This feature of the invention prevents communications from being lost.

As another embodiment, instead of a manual indication that the user desires communications to be forwarded to a specific location, the system may incorporate some type of automatic sensing device which determines the location of the intended recipient and automatically routes or forwards communications to the current location of the user. For example, some corporations currently use automated systems which determine whether employees are inside of a building. For example, the employees may use identification cards with bar codes which are scanned or identification cards which passively reflect communications from transmitters which are encoded with an identification unique to the employee. Alternatively, any other type of system may be utilized which keeps track of the location of an employee.

The ability to keep track of the location of a person allows the system, if desired, to search for the location of the recipient in order to properly deliver a communication. Such a feature would be advantageous when the information defining the location of the user, user profile, or travel itinerary of the user is incomplete, or the information defining the location of the user was corrupted or destroyed.

In the flowchart of FIG. 17, after starting, the user in step 622 predefines various locations and corresponding communication preferences and forwarding or routing information. In step 624, an automatic system indicates that the user is at a predefined location. Such an automatic system may encompass a badge reader, a bar code reader, or any type of automated sensor. After it is determined that the user is at a predefined location, the network office appliance communicates information to the user using the preferences corresponding to the predefined location of the user or recipient. The process of FIG. 17 then ends.

The various features of the embodiments of this invention may be combined in any desired or logical manner. Further, the examples provided are illustrative in nature and should not be taken as limiting. For example, the present invention may also be used to route mail (e.g., a hard copy) through any means desired by the user. An exemplary system of the distribution of mail is set forth in U.S. Pat. No. 5,648,916, which is incorporated herein by reference. Any of the teachings of U.S. Pat. No. 5,648,916 may be applied to the present invention.

A network office appliance has been described throughout. Such an appliance is a device which may be utilized to input and/or output and/or route communications. A computer which is utilized to route the communications may be different from the device which is utilized to input the communications from various sources.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

We claim:

1. A method of forwarding communications, comprising the steps of:

inputting a plurality of locations to which communications are to be routed to a recipient, and a communication mode and addressing information corresponding to each location;

selecting one of the locations and corresponding communication mode and addressing information corresponding to a destination location of the recipient; and forwarding a communication to the selected one of the locations using the corresponding communication mode and addressing information, wherein the recipient includes at least one of a person and a software agent, wherein the inputting step comprises;

manually inputting the plurality of locations to which communications are to be routed to the recipient and the communication mode and addressing information corresponding to each location using a general purpose software scheduler, the method further comprising the step of:

transferring data from the general purpose software scheduler to a program dedicated to controlling the forwarding of communications, and wherein communications sent to the recipient utilizing a first communication mode are forwarded to the selected one of the locations using a second communication mode which is the corresponding communication mode.

2. A method according to claim 1, wherein the selecting step comprises:

selecting said one of the locations using temporal information.

3. A method according to claim 2, wherein the recipient comprises a person, and wherein the selecting step comprises:

selecting said one of the locations using temporal information and a communication from the recipient indicating that the recipient has arrived at said one of the locations.

4. A method according to claim 1, wherein the recipient comprises a person, and wherein the selecting step comprises:

selecting said one of the locations in response to a message from a computer in the possession and control of a hotel indicating that the recipient has checked in to the hotel.

5. A method according to claim 1, wherein the recipient comprises a person, and wherein the selecting step comprises:

selecting said one of the locations by the recipient manually sending a message indicating that the recipient has arrived at said one of the locations.

6. A method according to claim 5, wherein the sending step of the selecting step comprises:

sending the message indicating that the recipient has arrived from a network office appliance which includes a scanner.

7. A method according to claim 5, wherein the sending step of the selecting step comprises:

sending the message indicating that the recipient has arrived from a device using one of an Internet electronic mail connection and a world wide web connection.

8. A method according to claim 5, wherein the sending step of the selecting step comprises:

sending the message indicating that the recipient has arrived using a telephone.

9. A method according to claim 1, further comprising the step of:

sensing a location of the recipient, wherein the recipient comprises a person, and wherein the selecting step comprises selecting said one of the locations based on the location of the recipient which has been sensed.

10. A method according to claim 9, wherein the sensing step comprises:

sensing an identification badge of the recipient.

11. A method according to claim 1, wherein the inputting step comprises:

manually inputting the plurality of locations to which communications are to be routed to the recipient and the communication mode corresponding to each location using forms which are specially prepared for use with a network office appliance and the addressing information.

12. A method according to claim 1, wherein the transferring step comprises:

transferring the data using a software agent.

13. A method according to claim 1, further comprising the step of:

selecting a predefined template which includes at least one of said locations and the corresponding communication mode and addressing information corresponding to the planned location of the recipient.

14. A system for forwarding communications, comprising:

means for inputting a plurality of locations to which communications are to be routed to a recipient, and a communication mode and addressing information corresponding to each location;

means for selecting one of the locations and corresponding communication mode and addressing information corresponding to a destination of the recipient; and means for forwarding a communication to said one of the locations which has been selected using the corresponding communication mode and addressing information, wherein the recipient includes at least one of a person and a software agent, and wherein the means for inputting comprises:

means for manually inputting the plurality of locations to which communications are to be routed to the recipient and the communication mode and addressing information corresponding to each location using a general purpose software scheduler, the system further comprising:

means for transferring data from the general purpose software scheduler to a program dedicated to controlling the forwarding of communications;

wherein communications sent to the recipient utilizing a first communication mode are forwarded to the selected one of the locations using a second communication mode which is the corresponding communication mode.

15. A system according to claim 14, wherein the selecting means comprises:

means for selecting said one of the locations using temporal information.

16. A system according to claim 15, wherein the recipient comprises a person, and wherein the selecting means comprises:

means for selecting said one of the locations using temporal information and a communication from the recipient indicating that the recipient has arrived at said one of the locations.

17. A system according to claim 14, wherein the recipient comprises a person, and wherein the selecting means comprises:

means for selecting said one of the locations in response to a message from a computer in the possession and control of a hotel indicating that the recipient has checked in to the hotel.

18. A system according to claim 17, wherein the sending means of the selecting means comprises:

a telephone.

19. A system according to claim 14, wherein the recipient comprises a person, and wherein the selecting means comprises:

means for sending, in response to a manual action by the recipient, a message indicating that the recipient has arrived at said one of the locations.

20. A system according to claim 19, wherein the means for sending of the selecting means comprises:

means for sending the message indicating that the recipient has arrived, from a network office appliance which includes a scanner.

21. A system according to claim 19, wherein the sending means of the selecting means comprises:

means for sending the message indicating that the recipient has arrived from a device using one of an Internet electronic mail connection and a world wide web connection.

22. A system according to claim 14, further comprising:

means for sensing a location of the recipient, wherein the recipient comprises a person, and wherein the selecting means comprises:

means for selecting said one of the locations based on the location of the recipient which has been sensed.

23. A system according to claim 22, wherein the sensing means comprises:

means for sensing an identification badge of the recipient.

24. A system according to claim 14, wherein the inputting means comprises:

means for manually inputting the plurality of locations to which communications are to be routed to the recipient and the communication mode corresponding to each location using forms which are specially prepared for use with a network office appliance and the addressing information.

25. A system according to claim 16, wherein the means for transferring comprises:

means for transferring the data using a software agent.

26. A system according to claim 14, further comprising:

means for selecting a predefined template which includes at least one of said locations and the corresponding communication mode and addressing information corresponding to the planned location of the recipient.

* * * * *